(12) United States Patent
Pedreño Jimenez

(10) Patent No.: US 7,381,929 B2
(45) Date of Patent: Jun. 3, 2008

(54) PORTABLE GRIDDLE

(75) Inventor: Jokin Pedreño Jimenez, Las Arenas-Getxo (ES)

(73) Assignee: Patent 2000, S.L. (ES)

(*) Notice: Subject to any disclaimer, the term of this patent is extended or adjusted under 35 U.S.C. 154(b) by 81 days.

(21) Appl. No.: 11/390,026

(22) Filed: Mar. 27, 2006

(65) Prior Publication Data
US 2006/0288878 A1    Dec. 28, 2006

(30) Foreign Application Priority Data
Jun. 27, 2005   (ES)   ............... 200501464 U

(51) Int. Cl.
H05B 3/68   (2006.01)
(52) U.S. Cl. ............... 219/450.1; 219/451.1
(58) Field of Classification Search .. 219/443.1–468.2; 99/372–384, 422–446
See application file for complete search history.

(56) References Cited

U.S. PATENT DOCUMENTS

| | | | | |
|---|---|---|---|---|
| 1,505,681 A | * | 8/1924 | Warner | 219/450.1 |
| 1,528,000 A | * | 3/1925 | Tugendhat | 219/450.1 |
| 3,398,264 A | * | 8/1968 | Katzman et al. | 219/450.1 |
| 3,842,726 A | * | 10/1974 | Fautz | 99/425 |
| 4,556,786 A | * | 12/1985 | Frost et al. | 219/459.1 |
| 5,374,807 A | * | 12/1994 | Yahav et al. | 219/466.1 |
| 5,530,224 A | * | 6/1996 | Sassman | 219/452.12 |
| 5,884,555 A | * | 3/1999 | Chang | 99/425 |
| 6,236,024 B1 | * | 5/2001 | Gotz et al. | 219/452.11 |

* cited by examiner

*Primary Examiner*—Sang Paik
(74) *Attorney, Agent, or Firm*—Lucas & Mercanti, LLP

(57) ABSTRACT

Portable griddle, which comprises a container (2) of metallic nature coated on the inside with a thermal wave reflector plate (6); one or several electric elements (7), placed on the inside of the container (2) but without direct contact with it so that air can circulate between the two; and a glass-ceramic plate (1), slightly sloping, covering the top of the container (2) and equipped with a peripheral groove (4) on its upper surface (S) with a conduit (9) that comes out in a sauce collector tray (5) placed under one edge of the glass-ceramic plate (1).

15 Claims, 2 Drawing Sheets

PORTABLE GRIDDLE

The subject of the invention is a new portable griddle that works electrically, which includes new components and functionalities with respect to already known ones.

The portable griddle according to the invention is characterised because it has:

a) a container of a metal nature coated on the inside with a thermal wave reflector plate;

b) one or several electric elements placed on the inside of the container but without direct contact with it so that the air can circulate between the two of them;

c) a glass-ceramic plate covering the upper part of the container and which has a peripheral groove on its top surface with a conduit that comes out into a sauce-collector tray placed sideways under one of the edges of the glass-ceramic plate.

In the current state of the technique, known griddles join the roasting plate and the metal container together around the perimeter, using mechanical solutions which, in origin, complicate the manufacture, and in use, make cleaning difficult. The griddle, according to the invention, superimposes plate and container around the perimeter, securing them together with an adhesive component.

the glass-ceramic plate is fitted with a slight slope, with the opening located in the lowest part of the peripheral groove to facilitate, during use, the automatic evacuation of the sauces to the tray;

the sauce-collector tray is removable from the glass-ceramic plate and container unit so that, for example, the sauce collected can be redistributed over the roast without using auxiliary utensils;

Based on this basic design, some specific practical executions are also included in the subject of the invention, which do not alter, change or modify the essentiality proposed.

In particular:

the electrical element(s) are placed on at least two supports between which, the container, the glass ceramic plate and the actual element(s) the air can circulate.

The sauce-collector tray is a mono-piece body which has forms on the ends so that it can be mounted/dismounted by pressure/traction onto the glass ceramic plate and container unit.

the container has different blocks that define the legs made of insulating material, at least one of them continuing into a portion that finishes in a separate container handle and without direct contact with it. One of these blocks or legs has a plug, controls and indicators (luminous warning light) with internal connection to the electric element(s).

It is indifferent and accessory to the purposes of the invention if:

the lower, inner wall of the sauce-collector tray has at least one channel, which acts as a sauce overflow or if it has, at least, one opening at its lowest point, which will be used to evacuate the sauces;

the aforementioned glass ceramic plate has a peripheral channel on the upper surface with a conduit that leads to the sauce-collector tray; as well as if this conduit is a through hole into the glass ceramic plate or a channel to the outside, which reaches its nearest side;

the glass ceramic plate has an upper flat or undulated surface.

In order to understand the subject of this invention better, a preferential form of practical execution is illustrated on the drawings, subject to incidental changes that take nothing away from its foundation.

Below an example of a non-limitative practical execution of this invention is described.

The subject of the invention is a new portable griddle that includes the following elements at least:

1.—Glass-ceramic plate.
2.—Container.
3.—Handle/leg block.
5.—Sauce-collector tray.
6.—Thermal wave reflecting sheet.
7.—Electric elements.

Figure 1:
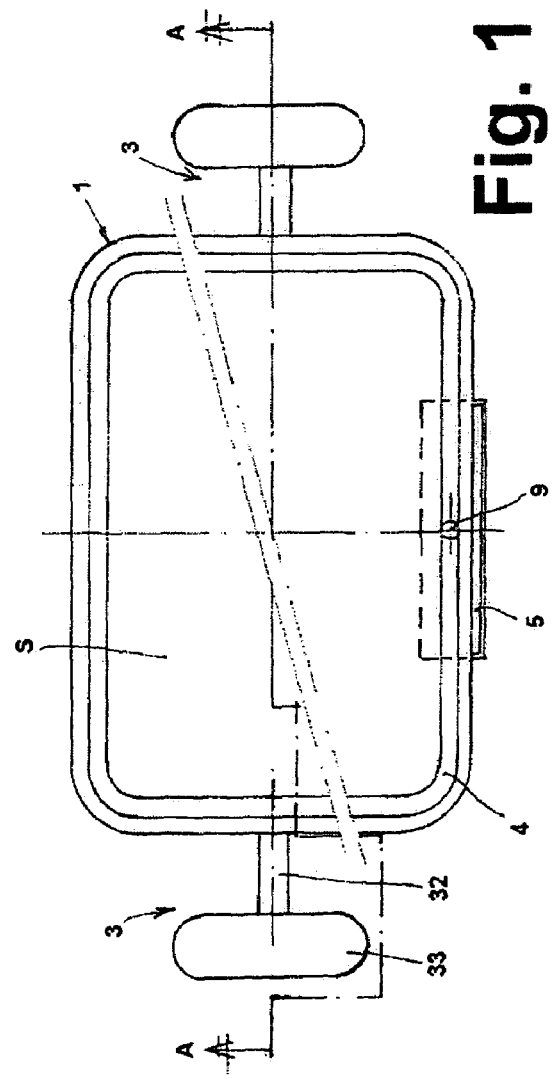
FIG. 1 shows a general schematic view of a portable griddle according to the invention.

In agreement with the invention, and according to the execution illustrated in FIG. 1, the glass-ceramic plate (1) defines a peripheral groove (4) on its top surface (S).

This peripheral groove (4) preferably has a closed configuration—as in FIG. 1—; although it may have an open configuration, which will not alter the essence of the invention. In any case, the glass-ceramic plate (1) has a conduit (9) executed in the lowest point of the peripheral groove (4).

Figure 5:
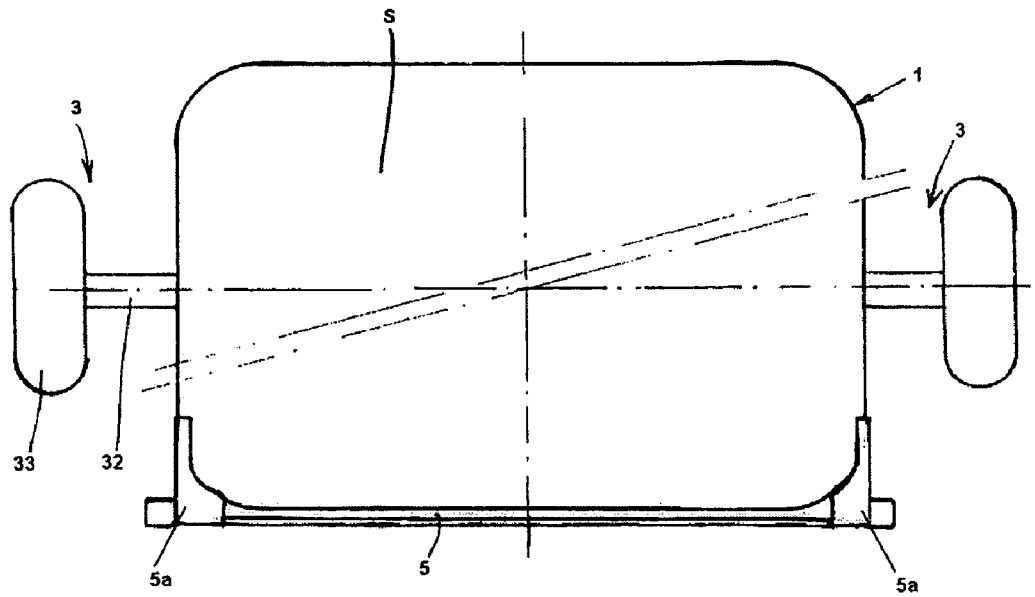
FIG. 5 shows a similar view to FIG. 1, for an execution variant.

In agreement with the invention, and according to the execution shown in FIG. 5, the glass ceramic plate (1) is completely flat, on its whole upper surface (S).

Figure 3:
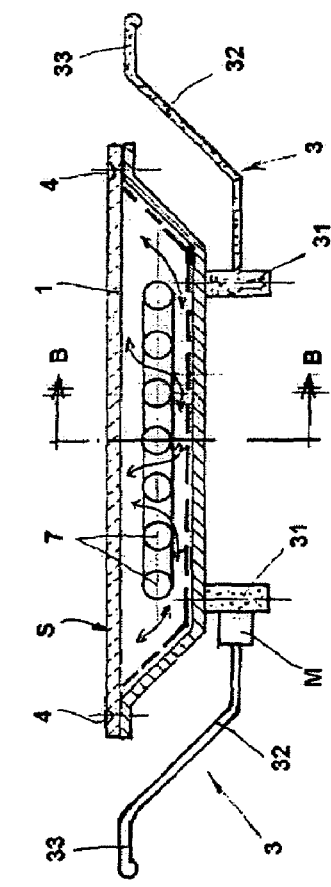
FIG. 3 shows a general schematic profile section, according to indication B:B of FIG. 2.

In either of the two executions, the glass ceramic plate (1) is fitted sloping with respect to the container (2); that is, in position of use, the glass-ceramic plate (1) slopes slightly towards one of its sides—slope (Δ) illustrated in FIG. 3

The container (2) is metal in nature and is coated on the inside with a plate (6) that reflects thermal waves.

On the inside, this container (2) has one or several supports (21) where the electric elements (7) are placed, without direct contact with the container (2) so that air can circulate between the two.

The container (2) has handles (33) and legs (31), both of which are made of insulating material.

Figure 2:
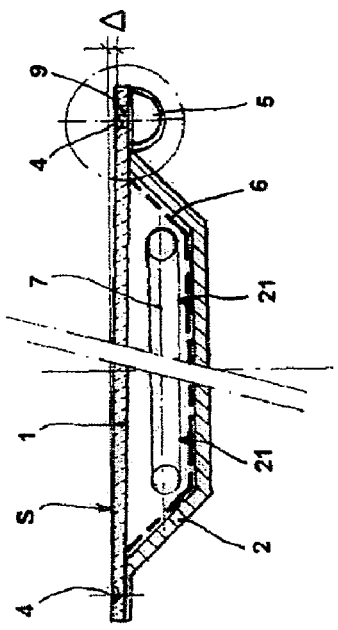
FIG. 2 shows a general schematic elevation section 1, according to indication A:A of FIG. 1.

In agreement with the invention and according to the execution illustrated, handles (33) and legs (31) form monoblocks (3), of insulating material, which define them in a continuous way (32) separated from the container (2). In one of them—see FIG. 2—there is a plug, controls and operating indicators, which can be mounted, without distinction, in a monoblock unit (M) or as independent elements.

The sauce-collector tray (5) is placed on the glass-ceramic plate (1) so that it can be removed, and it is positioned under the conduit (9) so that it facilitates both the automatic evacuation of the sauces generated on the surface (S) during the use of the griddle—firstly through the peripheral groove (4) and then through the conduit (9)—and their disposal or re-distribution over the roast, removing the tray (5).

For the execution shown—FIGS. 5 and 6—the sauce-collection tray (5) is an elongated mono-piece body, with forms on the ends (5*a*) to mount by simple pressure and dismount by simple traction from the unit, forming the glass ceramic plate (1) and edge of the container (2)—see FIG. 6—.

Figure 6A:
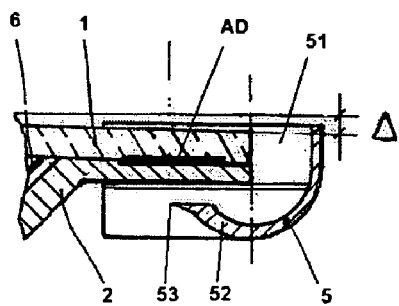
FIG. 6 shows an amplified detailed section similar to FIG. 4, for the execution variant show in FIG. 5 with overflow (53)—FIG. 6*a*—and with evacuation hole (54)—FIG. 6*b*—.
Figure 6B:
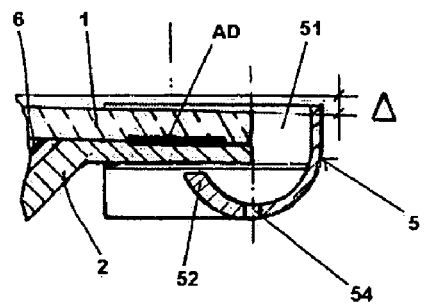

This mono-piece body (5) presents—see FIG. 6a—an approximately U-shaped section, with its flanges/wall of a different height: the positionally interior wall (52) is lower in height and has at least one groove (53), which acts as a sauce overflow, although alternatively it can be replaced with an opening (54) at its lowest point, this opening (54) acting as a sauce evacuator—see FIG. 6b—.

Figure 4:
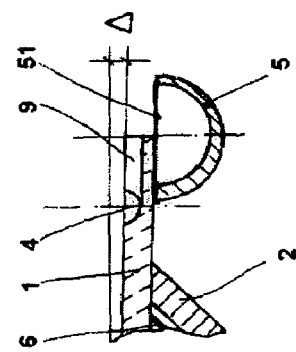
FIG. 4 shows an amplified detail, according to indication of FIG. 3.

For the execution with peripheral channel (4)—FIGS. 1, 3 and 4—the sauce-collector tray (5) is also placed sideways, but it is not necessary for it to occupy the whole side length: it is sufficient for it to occupy an area close to the conduit (9), underneath it—see FIG. 1—.

For this execution example, this conduit (9) may, without distinction, be a through-hole in the glass-ceramic plate (1), as illustrated in FIG. 3, or, preferably, an external conduit or small groove, that reaches the side nearest to the glass-ceramic plate (1), as illustrated in the amplified detail of FIG. 4, in which case, the sauce-collector tray (5) is placed with its intake (51) further along the actual edge of the glass-ceramic plate (1).

Indifferently, in any of the executions, the glass-ceramic plate (1) can be flat or undulating, acting, in the event of being undulating, as if it were a grill.

The glass-ceramic plate (1) and the metal container (2) are superimposed on the perimeter and secured together in this area using an adhesive component (AD), for example, silicone.

The invention claimed is:

1. Portable griddle, comprises:
   a container of a metallic nature with an open top coated on the inside with a thermal-wave reflector plate;
   one or several electric elements placed on the inside of the container but without direct contact with said container, so that air can circulate between them both;
   a glass-ceramic plate covering the top of the container; and
   a sauce-collector tray placed outside the container, directly underneath the glass-ceramic plate and sideways along an edge of the glass-ceramic plate, where said sauce-collector tray has an intake extended out of said edge of said glass-ceramic plate.

2. Portable griddle, according to claim 1, wherein the electric element(s) are placed on at least two supports.

3. Portable griddle, according to claim 1, wherein the glass-ceramic plate is fitted sloping slightly, with the conduit located in the lowest point of the peripheral groove, in order, during use, to facilitate the automatic evacuation of the sauces to the tray.

4. Portable griddle, according to claim 1, wherein the sauce-collector tray can be removed from the glassceramic plate and container unit.

5. Portable griddle, according to claim 4, wherein the sauce-collector tray is a mono-piece body with two ends, with forms on the ends for mounting/dismounting by pressure/traction to the glassceramic plate and container unit.

6. Portable griddle, according to claim 5, wherein this sauce-collector tray has an lower inner wall, equipped with at least one groove which acts as sauce overflow.

7. Portable griddle, according to claim 5, wherein this sauce-collector tray has at least one opening at its lowest point, which acts as sauce evacuator.

8. Portable griddle, according to claim 1, wherein the glass-ceramic plate is equipped with a peripheral channel on its upper surface, with a conduit which comes out into the sauce-collector tray.

9. Portable griddle, according to claim 8, wherein the conduit is a throughhole in the glass-ceramic plate.

10. Portable griddle, according to claim 1, wherein the conduit is a small channel to the exterior, which reaches the side nearest to the glassceramic plate.

11. Portable griddle, according to claim 1, wherein the glass-ceramic plate has a flat upper surface.

12. Portable griddle, according to claim 1, wherein the glassceramic plate has an undulating upper surface.

13. Portable griddle, according to claim 1, wherein the container has some blocks which define the legs made of insulating material, at least one of them continuing into a portion finished to form a handle (separated from the container and without direct contact with it.

14. Portable griddle, according to claim 13, wherein there is a plug, controls and operating indicators on one of said blocks or legs.

15. Portable griddle, according to claim 1, wherein the glass-ceramic plate and the container are secured around a corresponding perimeter to each other, using an adhesive component.

* * * * *